May 27, 1969     M. W. WALLACE     3,447,043
TUNNEL CATHODE IN MATRIX FORM WITH INTEGRAL STORAGE FEATURE
Filed Dec. 29, 1966
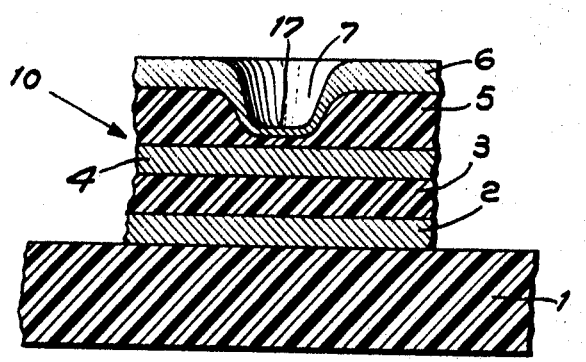
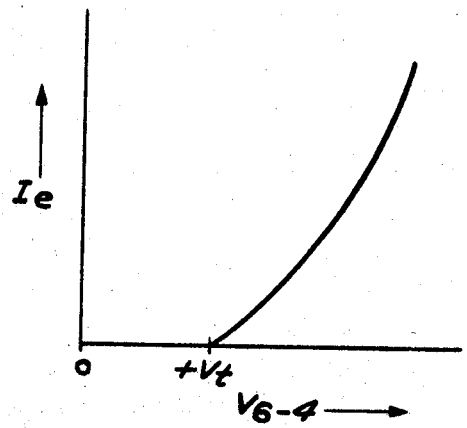
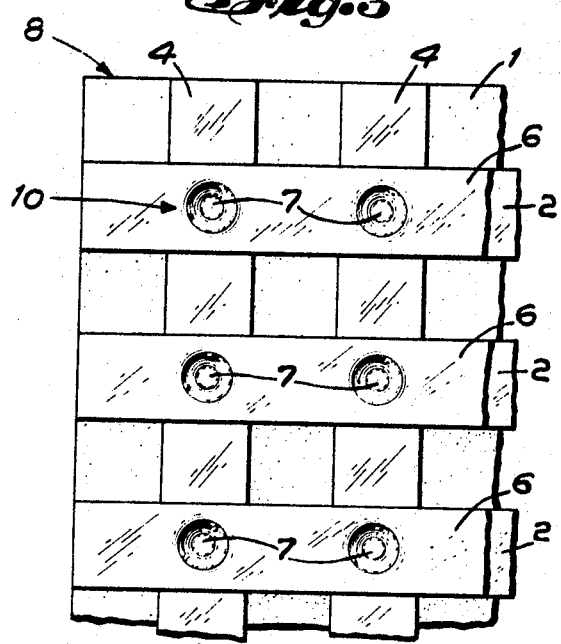
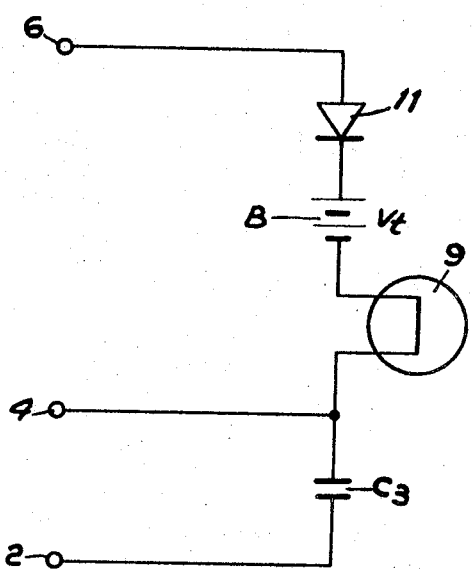
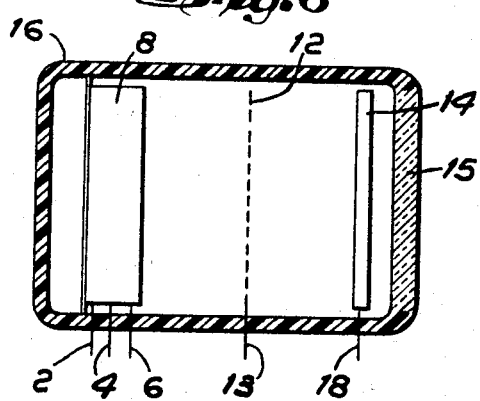
INVENTOR.
MILNER W. WALLACE
BY Arthur L. Lessler
ATTORNEY

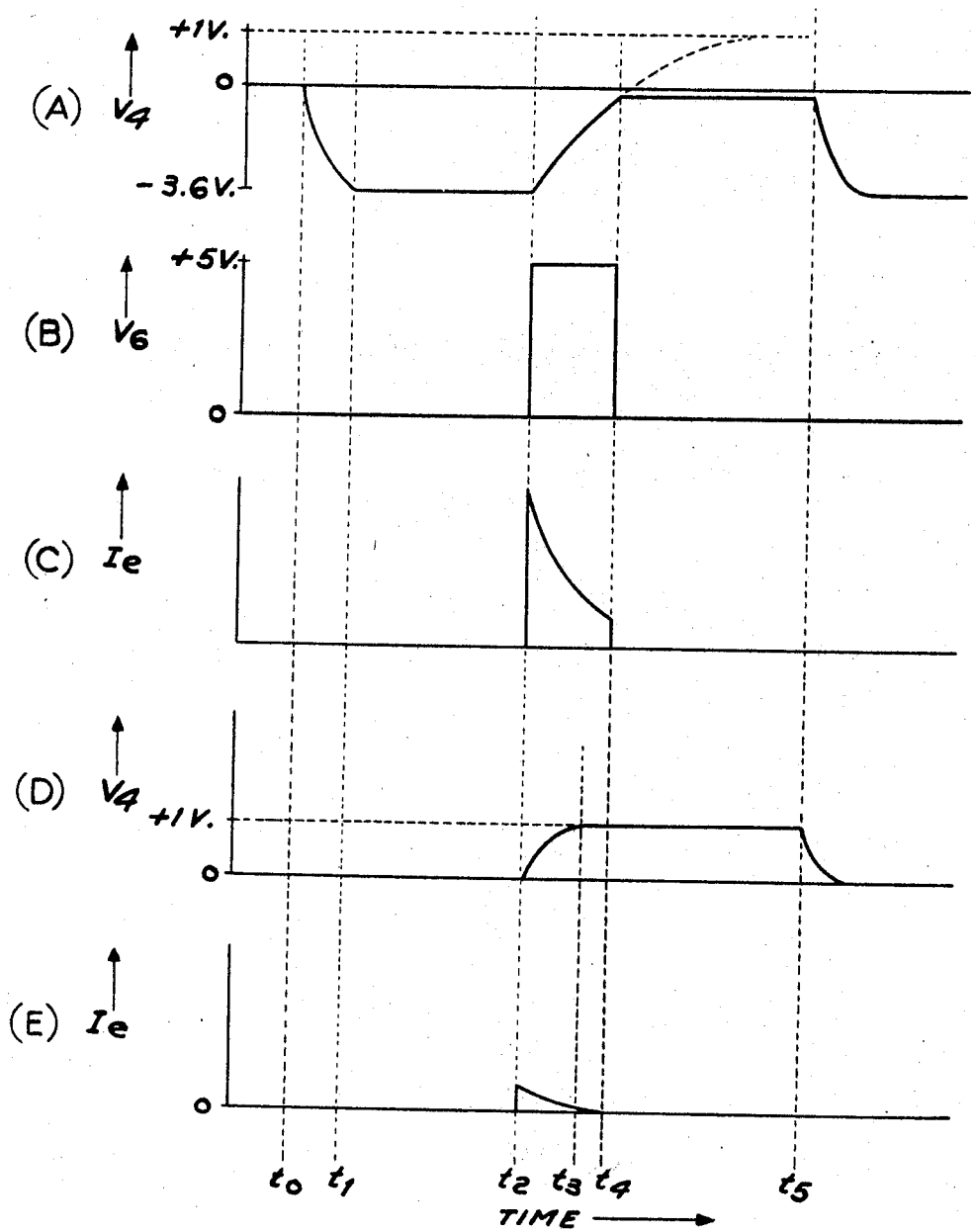

United States Patent Office 3,447,043
Patented May 27, 1969

3,447,043
TUNNEL CATHODE IN MATRIX FORM WITH INTEGRAL STORAGE FEATURE
Milner W. Wallace, Saddle River, N.J., assignor to International Telephone and Telegraph Corporation, Nutley, N.J., a corporation of Maryland
Filed Dec. 29, 1966, Ser. No. 605,927
Int. Cl. H01l 3/08
U.S. Cl. 317—234                    10 Claims

ABSTRACT OF THE DISCLOSURE

An electron discharge device including an electron-emitting matrix of metal-insulator-metal tunnel cathode elements, each said element having an integral capacitance cell comprising a metal-dielectric-metal structure such that one electrode of the capacitance cell is common with one electrode of the tunnel cathode proper. The tunnel cathode elements are interconnected to form a coordinate array such that each capacitance element may be selectively charged to place a predetermined voltage effectively in series with the corresponding tunnel cathode element. Application of a "read out" voltage to the matrix allows selective mission from those cathodes having charged capacitance cells.

Related patents

This invention relates to a tunnel-cathode electron discharge device of the general type disclosed in U.S. Patents Nos. 3,184,659, 3,246,200 and 3,257,581, which patents are representative of the prior art.

Background of the invention

This invention relates to electron discharge devices and in particular to cathodes in which electron emission is obtained by quantum mechanical tunneling.

The quantum mechanical tunneling phenomenon exhibited in metal-insulator-metal structures having extremely thin insulating layers is well known and is described, for example, in U.S. Patents Nos. 3,056,073, 3,121,177 and 3,242,396. Briefly, electron tunneling through a metal-insulator-metal structure involves a process wherein electrons penetrate or "tunnel" through the insulating barrier although the height of the associated potential barrier is greater than the total energy of the tunneling electrons. In order for the probability of such tunneling to be significant, the thickness of the insulating layer must generally be on the order of the mean free path of an electron in the insulating material. Typically, the insulator thickness required for the probability of such tunneling to be appreciable is on the order of 200 angstroms or less.

Electron emitting cathodes which utilize electron tunneling employ such a metal-insulator-metal structure wherein one of the metal layers is extremely thin "typically 300 angstroms or less" and has its exposed surface (i.e. the surface not contacting the thin insulating layer) free. When such a structure is placed in an evacuated envelope or contiguous with a "near perfect" insulator having relatively few electron traps and a potential greater than the work function of the thin metal layer is applied across the insulator, some of the electrons tunneling through the insulating layer proceed to penetrate the thin metallic layer and consequently to be emitted from the exposed surface of said metallic layer. A positively charged anode placed adjacent the cathode may then accelerate the emitted electrons to perform useful work either by providing power gain, selective switching illumination of a phosphor screen, or in any other well known manner for utilizing an electron beam or for processing an electron image.

Tunnel cathodes of this sort are well known in the art. For example U.S. Pat. No. 3,184,659 discloses the detailed structure of such a metal-insulator-metal tunnel cathode.

U.S. Pat. No. 3,246,200 shows a composite structure wherein photoconductive material is placed adjacent the tunneling insulator in order to modulate the voltage applied across said insulator in response to incident radiation impinging upon the photoconductive material, thereby to modulate the electron flow emitted from said tunnel cathode.

U.S. Pat. No. 3,257,581 shows a compound tunnel cathode structure in the form of a matrix of individual electron emitting tunnel cathode elements. The corresponding metal layers of each element are interconnected to form a series of parallel strips, the strips corresponding to one metal layer of each element forming a coordinate array with the strips corresponding to the other metal layer of each element. By applying suitable switching signals to selected strips of each series electron emission is obtained from selected tunnel cathode elements of the matrix. U.S. Pat. No. 3,257,581 also discloses the use of such a tunnel cathode matrix in a storage tube wherein the electrons emitted from the tunnel cathode are accelerated to impinge upon a storage target electrode. The impinging electrons selectively charge the target electrode by secondary emission.

None of the electron discharge devices employing tunnel cathodes in accordance with the prior art, however, describe such a cathode structure having integral storage means. The tunnel cathode electron discharge device of U.S. Pat. No. 3,257,581 utilizing a separate storage electrode, involves a relatively complex mechanical construction with attendant problems of alignment between the various elements thereof.

Accordingly, an object of the present invention is to provide an improved tunnel cathode electron discharge device having storage means integral with the cathode structure thereof.

Summary

The present invention provides a novel tunnel cathode electron discharge device having signal storage means integral with the tunnel cathode structure. The integral storage means includes a capacitance cell one electrode of which is contiguous with an electrode of the active portion of the tunnel cathode element. Another feature of the invention is a matrix array of such integral storage tunnel cathode elements together with a series of conductive strips forming a first coordinate array for selectively charging the tunnel cathode element capacitance cells, and a second coordinate array for selectively energizing particular tunnel cathode emitting elements of the matrix array.

In the drawing

FIG. 1 shows a tunnel cathode element according to the invention;

FIG. 2 shows a typical voltage-current transfer characteristic for the element shown in FIG. 1;

FIG. 3 shows a portion of a matrix and associated coordinate array according to the invention;

FIG. 4 shows an equivalent circuit for the tunnel cathode element of FIG. 1;

FIG. 5 shows waveforms associated with operation of the element shown in FIG. 1; and FIG. 6 shows a complete electron discharge device according to the invention.

Detailed description

FIG. 1 shows a unitary tunnel cathode element incorporating an integral storage element according to the invention.

The tunnel cathode element 10 may comprise one element of a matrix such that the various conductive and non-conductive layers forming each element extend throughout the matrix. The element 10 comprises a first conductive layer 2 secured to the support 1. While the support 1 should preferably comprise a relatively rigid insulating material it is also permissible for the support 1 and the conductive layer 2 to comprise a single unitary structure, such as a relatively thick metallic plate. Preferably, the support 1 may comprise a glass plate, and the conductive layer 2 may comprise a deposited film of, e.g., oxidizable metal such as aluminum, tantalum, or titanium. Aluminum is easily deposited and may readily be controllably oxidized by, e.g. anodizing; therefore aluminum is preferred for the first conductive layer 2.

Formed on the first conductive layer 2 is a layer of dielectric material 3 which may preferably be formed by controllably anodizing the aluminum layer 2 to form a dielectric aluminum oxide layer 3 having the thickness necessary for realization of the particular capacitance value desired. Deposited on the dielectric layer 3 is a second conductive layer 4, preferably of aluminum. Beryllium or magnesium may also be used for the conductive layer 4. The layers 2, 3 and 4 form a capacitance cell, the capacitance of said cell being determined by the common area of the opposed first and second conductive layer 2 and 4 as well as the thickness and dielectric constant of the aluminum oxide dielectric layer 3.

Deposited on the second conducitve layer 4 is an insulating layer 5 having a thin insulating film portion in the region 7. The insulating layer 5, as well as the thin insulating film portion thereof, may preefrably be formed by selective oxidation of the second conductive aluminum layer 4, employing well known masking techniques as described, e.g., in U.S. Pat. No. 3,184,659. The thin insulating film portion of the insulating layer 5 in the region 7 should preferably have a thickness on the order of 80 angstroms so that this thin insulating film forms a quantum mechanical barrier sufficiently thin so that the probability of electrons tunneling through said thin insulating layer is significant. The relatively thick portion of the insulating layer 5 should be sufficiently thick to preclude electron tunneling therethrough, e.g., 0.3 micron or more. Deposited atop the insulating layer 5 is a thin metal layer 17, preferably of gold. This thin metal layer 17 preferably has a thickness on the order of 120 angstroms in the region 7, in order that at least a portion of any electrons tunneling through the thin insulating film portion of insulating layer 5 may penetrate the metal layer 17 to cause substantial electron emission from the exposed surface of said metal layer 17. The thin metal layer 17 has a thickened portion 6 in the area removed from the active region 7, in order to reduce the lateral resistance to current flow in said metal layer.

The aforementioned second conductive layer 4 and the adjacent part of the thin insulating layer portion of insulating layer 5, as well as the thin metal layer 17, together form an active tunnel cathode structure capable of electron emission when a voltage exceeding a predetermined threshold value, on the order of the work function of the thin metal layer 17, is applied between the second conductive layer 4 and the thin metal layer 17.

FIG. 2 shows a typical voltage-current transfer characteristic for the active tunnel cathode structure of FIG. 1. The horizontal axis shows the voltage or potential difference applied between conductive elements 6 (and consequently 17) and 4, whereas the vertical axis shows the resultant electron emission current from the tunnel cathode element 10. It is seen that until the applied potential difference reaches a threshold value $V_t$, no substantial electron emission occurs. When the potential difference exceeds the threshold value $V_t$, however, electron emission takes place, the emitted current increasing rapidly with further increase in applied potential difference.

FIG. 3 shows a tunnel cathode structure comprising a matrix 8 of individual tunnel cathode elements 10. Each of the tunnel cathode elements 10 is secured to a common support to form a cathode matrix. The common support may, e.g., comprise a single glass plate 1. The first conductive layers 2 of each tunnel cathode element 10 are electrically interconnected to form a series of parallel strips, as shown in FIG. 3. This may be accomplished simply by depositing aluminum layers in the required strip form across the surface of the glass plate 1. Similarly, the second conductive layers 4 of each tunnel cathode element 10 are interconnected to form a series of parallel strips transverse to the strips formed by the first conductive layers 2. The dielectric layer 3 may be formed only at the intersection between the first and second series of strips corresponding to the first and second conductive layers of each tunnel cathode element 10, or the insulating layer 3 may preferably cover the entire surface of the support 1 including the first conductive layer strips 2.

The insulating layer 5 is then formed on the entire surface of the support 1, or may if desired be formed only at the intersections between the first and second conductive strips 2 and 4. The insulating layer 5 has a portion of reduced thickness forming a thin insulating layer at the regions 7 within the intersecting portions of the conductive strips 2 and 4. This thin insulating layer portion exhibits quantum mechanical tunneling when a sufficiently high potential difference is applied across said thin insulating portion. A series of metal strips 6 transverse to the conductive strips 4 is then formed such that each of the metal strips 6 has a portion of reduced thickness in the region 7 forming a thin metal layer 17 such that the resultant structure at each intersection of the strips 2, 4 and 6 comprises a tunnel cathode element 10 in accordance with FIG. 1. In order to minimize the voltage drop and consequent heating effect due to the transverse resistance of the thin metal layer portions these thin layer portions should preferably have a relatively small diameter, limiting the emitting area of each tunnel cathode element to a circular region on the order of 0.010 inch in diameter.

FIG. 4 shows an equivalent circuit for the tunnel cathode element 10 of FIG. 1. The capacitance cell comprised of the first and second conductive layers 2 and 4 with the dielectric 3 disposed therebetween, is represented by the capacitance symbol $C_3$. It should be appreciated that while the effective emitting area of the tunnel cathode element 10 is limited to the active region 7, no such limitation applies to the capacitance cell, so that the capacitance of this cell may have a relatively large value.

Again referring to FIG. 4, the active emitting portion of the tunnel cathode element 10 is represented by a conventional diode 11, a battery B having a voltage equal to the threshold value $V_t$ of the tunnel cathode active emitting structure, and an emitter 9 which emits electrons whenever current flows therethrough, the emitter 9 being assumed to have negligible series resistance. The terminals 2, 4 and 6 of FIG. 4 correspond to connections to the conductive layers 2, 4 and 6 shown in FIG. 1. Inspection of FIG. 4 indicates that no current will flow through the emitter 9 until the voltage applied between the terminals 6 and 4 exceeds the value $V_t$, at which point the current will rapidly increase. Thus it is evident that the voltage-current characteristic exhibited between terminals 6 and 4, at least for a voltage applied between these terminals such that terminal 6 is more positive than terminal 4, will yield a voltage-current transfer characteristic similar to that shown in FIG. 2.

The waveform shown in FIG. 5, taken in conjunction with the equivalent circuit of FIG. 4, will now be used to explain the manner in which the tunnel cathode element 10 shown in FIG. 1 may be operated. It should be kept in mind that the tunnel cathode element 10 represents any selected element in the cathode matrix 8 shown in FIG. 3. Suitable operating voltages can be applied to the conductive layers 2, 4 and 6 of any selected elements of the matrix 8 by applying corresponding potentials to selected strips 2, 4 and 6 (FIG. 3) to energize any particular element at the intersection of said selected strips.

When information is to be stored in a capacitance cell of a particular tunnel cathode element 10, a voltage pulse is applied between the electrodes 2 and 4 of said capacitance cell such that electrode 4 is driven negative with respect to electrode 2. In the following discussion electrode 2 will be taken as the reference electrode, assumed to be at ground potential, and all other potentials will be described with reference to the presumably grounded electrode 2. Moreover, the following discussion assumes that each tunnel cathode element 10 has a voltage-current transfer charactristic similar to that shown in FIG. 2, with a threshold value $V_t$ on the order of 4 volts.

Application of the aforementioned pulse to the capacitance cell charges the capacitor $C_3$ (FIG. 4) so that electrode 4 reaches a desired negative potential. The waveform showing the potential at electrode 4 when the capacitance cell is being charged is shown in FIG. 5(A). The charging pulse applied to electrode 4 is a negative going rectangular waveform with a peak amplitude of 3.6 volts, commencing at time $t_0$ and terminating at time $t_1$. After the pulse terminates, the electrode 4 is disconnected from the external circuitry utilized to apply said pulse, so that the capacitance cell remains charged to a potential (at electrode 4) of −3.6 volts, as shown in FIG. 5(A). By charging selected tunnel cathode element capacitance cells of the matrix 8 (FIG. 3), information corresponding to any desired pattern, e.g., representing a binary matrix or alphanumeric character, may be stored in the matrix 8. In order to "read out" the information stored in the charged capacitance cell, a positive pulse, shown in FIG. 5(B) and having an amplitude, e.g., on the order of 5 volts, is applied to electrode 6. Depending upon the manner in which the electron discharge device of the invention is to be operated, this "read out" voltage pulse may be applied to all tunnel cathode elements of the matrix 8, or only to those elements corresponding to a desired pattern. Thus by storing one pattern in the capacitance cells of the matrix 8 and applying another pattern to the metallic layers 6 of selected cathode elements 10 of the matrix 8, it is possible to obtain a measure of the correlation between said patterns by sensing the resultant electron emission from the matrix 8.

Returning to FIG. 5, application of the 5 volts pulse shown in FIG. 5(B) to the electrode 6 results in an instantaneous potential difference of 8.6 volts across the active emitting portion of the tunnel cathode element 10 (FIG. 1) comprised of conductive layers 4 and 6 (i.e. the thin metal layer portion 17) having insulating layer 5 (i.e. the thin portion of said insulating layer in the region 7) therebetween. As seen in FIG. 2, this value of 8.6 volts, being substantially greater than the assumed threshold value of $V_t$ of 4 volts produces a relatively large electron emission from the active region 7 of the tunnel cathode element 10. It is assumed that the tunnel cathode element 10 is situated in a surrounding vacuum, a partial vacuum containing a gas, or a "near perfect" insulator which performs a function substantially equivalent to that of a vacuum, i.e. an insulator which does not substantially impede space charge limited electron flow.

Again referring to FIG. 5, the resultant electron current emitted from the tunnel cathode element 10 when the "read out" pulse shown in FIG. 5(B) is applied to the electrode 6, is shown in FIG. 5(C). While the voltage appearing between electrodes 6 and 4 is initially 8.6 volts and results in a relatively large emitted current flow, the resultant current charges the capacitance cell comprised of layers 2, 3 and 4, so that the potential at electrode 4 begins to rise exponentially toward a level of +1 volt, i.e. toward the difference between the voltage applied to terminal 6 (5 volts) and the drop across the active emitting portion of the tunnel cathode element 10, said drop being substantially equivalent to the threshold voltage $V_t$ of 4 volts, as seen in the equivalent circuit of FIG. 4.

In FIG. 5, the "read out" pulse is assumed to commence at a time $t_2$ and to terminate at $t_4$. Referring to FIGS. 5(A) and 5(B) as the capacitance cell charges toward the aforementioned +1 volt level, the potential difference between electrodes 6 and 4 decreases, resulting in a corresponding decrease in the emitted current. When the "read out" pulse is terminated, a potential difference is no longer existent between the terminals 6 and 4, and the emitted current ceases. The corresponding waveform of the emitted current flow is shown in FIG. 5(C).

FIGS. 5(D) and 5(E) show what happens in those tunnel cathode elements 10 of the matrix 8 whose capacitance cells have not been previously charged by the aforementioned negative going pulse applied to the electrodes 4 thereof. FIG. 5(D) shows the waveform at the electrode 4 when the read out pulse of 5 volts is applied to electrode 6. It is seen that the electrode 4 remains at ground potential until the commencement of the read out pulse, at which time ($t_2$) the capacitance cell charges toward the one volt level. The capacitance cell remains charged to said one volt level until a later time $t_5$ when new information is stored (or restored) in selected elements 10 of the matrix 8, and those capacitance cells not so selected are discharged to ground potential.

FIG. 5(E) shows the emitted current waveform from the non-selected tunnel cathode element 10. At the initiation of the 5 volt read out pulse, the potential difference between the electrodes 6 and 4 is 5 volts, just slightly greater than the threshold value $V_t$ of 4 volts at which electron emission commences. Therefore a relatively small amount of electron emission will take place from this non-selected element. As the capacitance cell charges, the potential at electrode 4 rises toward the one volt level, while the potential difference between electrodes 6 and 4 approaches 4 volts. Consequently, the resultant emitted current decreases from its initial relatively small value toward zero, and ceases when the potential at electrode 4 has reached the one volt level, i.e. at time $t_3$.

It should be appreciated that the electron emission from those non-selected elements 10 of the matrix 8 may be reduced substantially to zero by utilizing a read out pulse amplitude of 4 volts or less, in which case the potential difference between electrodes 6 and 4 of the non-selected elements will never exceed the 4 volt threshold level required for emission. Operation in such a manner will, of course, somewhat reduce the electron emission from the selected elements of the matrix.

While the strips 2, 4 and 6 of the matrix 8 may be energized responsive to the control of logic circuitry well known in the art for the purpose of performing correlation, character recognition, storage/display and other functions, it should be kept in mind that the switching circuitry connected to the strips 4 and/or 2 should be of relatively high impedance in the "off" condition in order that the charges of the selected capacitance cells will not leak off through said switches. For this purpose, relays (e.g. reed relays) or high impedance solid state switching elements such as low leakage diodes are preferred. It should also be appreciated that many embodiments of the invention other than those specifically described are possible without departure from the novel concepts herein disclosed.

In an electron discharge device with even a moderately large tunnel cathode matrix the number of leads to be brought out is large; for example, an 18 x 32 cathode matrix would have at least 18+18+32=68 leads. For this reason a portion, if not all, of the switching circuitry may be inside the device envelope so that the switching connections are made internally and only a relatively few leads, to be energized in accordance with a suitable code, need be brought through seals to the outside of the envelope.

FIG. 6 shows a complete electron discharge device according to the invention. The device comprises a casing 16 having a transparent window 15. A cathode matrix 8 of the type shown in FIG. 3 is disposed within the casing 16 and supported by mechanical connections to the casing. Terminal lead groups 2, 4 and 6 electrically connected to corresponding strips 2, 4 and 6 of the matrix 8 are brought out through suitable seals in the casing 16. Spaced from and substantially parallel to the emitting surface of the matrix 8 is an apertured accelerating grid 12 having a corresponding lead 13 extending through the casing 16. Spaced from the accelerating grid 12 is a screen or electrode 14. The device may be used as a storage/display tube wherein information to be stored is inserted by charging selected capacitance cells of particular cathode elements 10, as previously described. Electrons emitted from said selected elements when read out pulses are applied thereto by means of electrodes 6 and 2 are accelerated by the accelerating grid 12 (which is supplied with a large positive potential relative to the cathode matrix 8) to impinge on the phosphor screen 14. The screen 14 emits visible light in response to electron exicitation, so that a visible pattern corresponding to the arrangement to the selected tunnel cathode elements 10 appears when the tube is viewed through the window 15. It may in some cases be desirable to coat the surface of the phosphor screen 14 facing the accelerating electrode 12 with a thin electron permeable conductive large, e.g. of aluminum. A large positive potential can then be applied to this conductive layer to further accelerate the electrons emitted from the matrix 8 toward the phosphor screen 14.

Where visual read out of the stored information is not required, the phosphor screen may be replaced by a conductive plate 14 to which is applied a large positive potential. The conductive plate may comprise a single metallic element, or alternatively a plurality of small metallic elements each corresponding to and in juxtaposition with a related tunnel cathode element 10 of the matrix 8. In either event, signals may be applied to the capacitance cells of the matrix 8 by means of the leads 4 and 2, and to the active emitting portions of the elements 10 by means of leads 6 and 2, such that the resultant electron beam (or beams) collected at the conductive electrode 14 indicates the electron current flow emitted from the matrix 8. The current thus collected by electrode 14 and brought out of the casing 16 by the terminal or terminals 18, may be utilized for control or switching purposes, or as an indication of the degree of correlation between the various signals applied to the cathode matrix 8. Simultaneous electrical readout is attainable by monitoring the current flowing into each individual cathode element.

While the principles of the invention have been described above in connection with specific embodiments, and particular modifications thereof, it is to be clearly understood that this description is made only by way of example and not as a limitation on the scope of the invention.

I claim:
1. An electron discharge device including an electrically controllable cathode element, said cathode element comprising:
   a first conductive layer;
   a layer of relatively thick non-conductive dielectric material on said first layer;
   a second conductive layer on said dielectric layer, said first, second and dielectric layers forming a capacitance cell charge storage element, said second conductive layer providing an electron source;
   an insulating layer on said second conductive layer, said insulating layer a relatively thin insulating film portion forming a quantum mechanical barrier, said film being sufficiently thin so that said barrier exhibits quantum mechanical tunneling of electrons therethrough from said second layer when a predetermined potential difference is applied across said film; and
   a thin metal layer on said thin insulating film, said metal layer having an exposed surface and being sufficiently thin so that at least a portion of any electrons tunneling through said thin insulating film will penetrate said metal layer to cause substantial electron emission from the exposed surface of said metal layer when a voltage exceeding a predetermined threshold value is applied betwen said second conductive layer and said metal layer.

2. An electron discharge device according to claim 1, further comprising:
   means connected to said first and second conductive layers for charging said capacitance cell to a given potential; and
   means connected to said second conductive layer and said metal layer for applying a voltage thereto in excess of said threshold value to cause substantial electron emission from said element responsive to said potential charge of said cell.

3. An electron discharge device according to claim 2, comprising:
   a plurality of said cathode elements arranged to form a cathode matrix; and
   means for applying electrical control signals to selected ones of said elements to cause said substantial electron emission therefrom, the electrons so emitted forming an electron image corresponding to the arrangement of said selected elements.

4. An electron discharge device according to claim 3, wherein:
   the first conductive layers of each of said elements are electrically interconnected to form a lower series of substantially parallel strips;
   the second conductive layers of each of said elements are electrically interconnected to form a lower series of substantially parallel strips;
   the metal layers of each of said elements are electrically interconnected to form an upper series of substantially parallel strips.

5. An electron discharge device according to claim 4, wherein said lower series of strips and said middle series of strips are mutually transverse such that said lower and middle series comprise a first coordinate array.

6. An electron discharge device according to claim 5, wherein said lower series of strips and said upper series of strips are mutually transverse such that said lower and upper series comprise a second coordinate array.

7. An electron discharge device according to claim 6, further comprising:
   means for selectively energizing the strips of said first coordinate array to charge the capacitance cells of selected ones of said elements to a given potential; and
   means including said second coordinate array responsive to the condition of said capacitance cells for applying a voltage in excess of said threshold value between the first conductive layer and the metal layer of those particular ones of said elements having a capacitance cell charged to said given potential, thereby to cause substantial electron emission from said particular elements.

8. An electron discharge device according to claim 4, further comprising:
   an electron responsive phosphor screen spaced from and substantially parallel to said cathode matrix; and
   means for accelerating any electrons emitted from said cathode matrix toward said screen to produce a visible pattern on said screen corresponding to the arrangement of the cathode elements emitting said accelerated electrons.

9. An electron discharge device according to claim 4, further comprising:
a conductive electrode spaced from and substantially parallel to said cathode matrix;
means for accelerating any electrons emitted from said cathode matrix toward said electrode; and
means electrically connected to said electrode and responsive to the current therethrough for sensing the electron emission from said cathode matrix.

10. An electron discharge device according to claim 1 including an evacuated envelope, said cathode element being disposed therein, an electrode spaced from the exposed surface of said cathode element, and means for accelerating electrons emitted from said surface toward said electrode.

References Cited
UNITED STATES PATENTS

| | | | |
|---|---|---|---|
| 3,257,581 | 6/1966 | Lodge | 315—169 |
| 3,184,659 | 5/1965 | Cohen | 317—238 |
| 3,121,177 | 2/1964 | Davis | 307—88.5 |
| 3,368,077 | 2/1968 | Kazan | 250—213 |

JOHN W. HUCKERT, *Primary Examiner.*

M. EDLOW, *Assistant Examiner.*

U.S. Cl. X.R.

307—206, 298, 322; 313—108; 317—235; 340—173